United States Patent Office 3,138,498
Patented June 23, 1964

3,138,498
LITHIUM PERCHLORATE-HYDRAZINE COORDINATION COMPOUND AND PROPELLANT
Douglas A. Rausch, Midland, Mich., assignor to The Dow Chemical Company, Midland, Mich., a corporation of Delaware
No Drawing. Filed July 1, 1960, Ser. No. 40,472
4 Claims. (Cl. 149—36)

This invention relates to a lithium perchlorate-hydrazine coordination compound.

Metallic fuels, such as aluminum, magnesium, and beryllium, or mixtures thereof, yield large quantities of heat upon oxidation and have a great potential as a fuel in rocket propellants. However, the common oxidizers such as perchlorates and nitrates heretofore used for the metallic fuels result in reaction products which are high molecular weight solids. The thrust obtained with the metal fuels would be considerably increased by use of an oxidant which produces a reaction product containing a low molecular weight driving fluid such as a gas. An excellent gas-forming material for improving the performance of a fuel is hydrazine. Since hydrazine is a liquid, the incorporation of this material into a solid rocket propellent is difficult.

It is therefore an object of this invention to provide a novel compound which may be used as an oxidant in solid propellants. Another object is to provide a solid oxidant having the advantages of hydrazine. A still further object is to provide a solid propellent employing metallic fuels and the compound as an oxidant.

The above and other objects are attained by the novel compound which is a lithium perchlorate-hydrazine coordination product. It is a white solid having a melting point about 140° C. and has a mole ratio of 2 moles of hydrazine per mole of lithium perchlorate.

The compound may be prepared by intermixing hydrazine with lithium perchlorate under substantially anhydrous conditions. However, since the reaction is exothermic, an inert organic solvent or a diluent is preferably used. The ideal diluent is one in which the reactants are soluble, but the lithium perchlorate-hydrazine coordination product is not. Among the most readily available solvents which will fill this requirement and result in high yields of the desired product is a solvent comprising a mixture of an ether and an alkanol. Lithium perchlorate is soluble in the low molecular weight ethers, while hydrazine is soluble in alkanols. The desired product is only slightly soluble in this mixture. With the solvent, the complex product obtained is in an easily filterable precipitate form and may thus be readily recovered from the reaction mixture by filtration or settling. The filtrate obtained can be reused as a reaction solvent. Thus the small amount of the lithium perchlorate-hydrazine product which may dissolve in the solvent is not lost. Alkanols having from 2 to 4 carbon atoms and the lower aliphatic and alicyclic ethers, such as alkyl ethers having alkyl radicals containing from 1 to 4 carbon atoms and tetrahydrofuran, are most often intermixed to form the solvent. A mixture of ethyl alcohol and ethyl ether is preferred. The ratio of ether to alcohol used is not critical, but generally a sufficient amount of alcohol is used to dissolve the hydrazine. This usually requires an ether-alcohol mixture which contains from about 2 to 5 moles of ether per mole of alcohol.

When the coordination product is used as an oxidant in a solid propellant, it may be incorporated with or without other oxidants with the metallic fuel by the various known methods. For example if the fuel is in powder or particulate form, the product can just be intermixed with the fuel and a binder, if necessary, used. If the fuel used is in the form of a porous cellular element, the coordination product may be used to fill the voids. The ratio of the coordination product to fuel are in the ranges normally used in propellants. Stoichiometric amount or slight excess of the oxidant is generally used.

To illustrate the preparation of the novel compound, 5 grams of anhydrous lithium perchlorate were dissolved in 200 milliliters of ethyl ether. A stoichiometric amount of anhydrous hydrazine was also dissolved in a 50–50 volume percent of an ethyl alcohol-ethyl ether mixture. The hydrazine solution was added to the lithium perchlorate solution while the mixture was being stirred. The novel compound, $Li(N_2H_4)_2ClO_4$, precipitated immediately. The compound was washed with anhydrous ethyl ether and dried in vacuum. Approximately 7.2 grams of the product was obtained which represented a yield of 90 percent.

The product was a white solid having a melting point of about 140° C. Upon heating the molten product to a temperature of about 210° C., the product decomposed.

The analysis of the product indicated that it contained 4.1 percent lithium, 38.2 percent of hydrazine, and 21.4 percent chlorine. This compared to the theoretical percentages of 4.07 percent lithium, 37.6 percent of hydrazine, and 20.8 percent of chlorine. Infrared analysis indicated the presence of the hydrazine molecule and X-ray diffraction showed an unreported pattern.

To illustrate the utility of the compound, the compound was intermixed with powdered aluminum to form a propellant containing 10 weight percent aluminum and 90 weight percent of the compound. This propellant was ignited in a test bomb and gave an experimental specific impulse of 256. A calculation of the specific impulse indicates that the theoretical specific impulse is 272. If magnesium is used as a fuel a specific impulse of 268 may be obtained.

What is claimed is:

1. A lithium perchlorate-hydrazine coordination compound having a mole ratio of 2 moles of hydrazine per mole of lithium perchlorate.

2. A solid propellant consisting essentially of lithium perchlorate-hydrazine coordination product as an oxidant intermixed with a metallic fuel selected from the group consisting of aluminum, magnesium, and beryllium.

3. A solid propellant consisting essentially of lithium perchlorate-hydrazine coordination product intermixed with aluminum as a fuel.

4. A solid propellant consisting essentially of lithium perchlorate-hydrazine coordination product intermixed with magnesium as a fuel.

References Cited in the file of this patent

Audrieth: "The Chemistry of Hydrazine," John Wiley and Sons Inc., New York (1951), pp. 181–194.